Patented Aug. 15, 1944

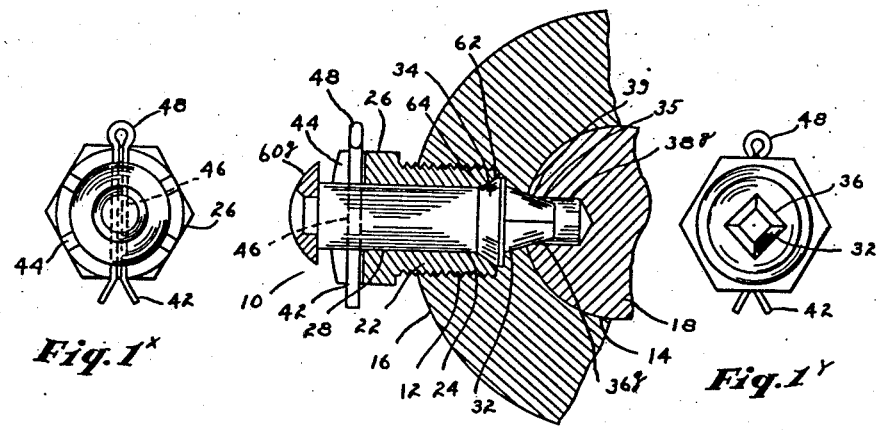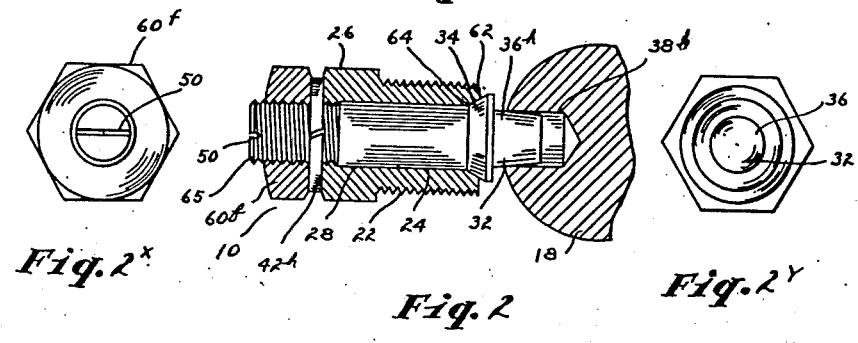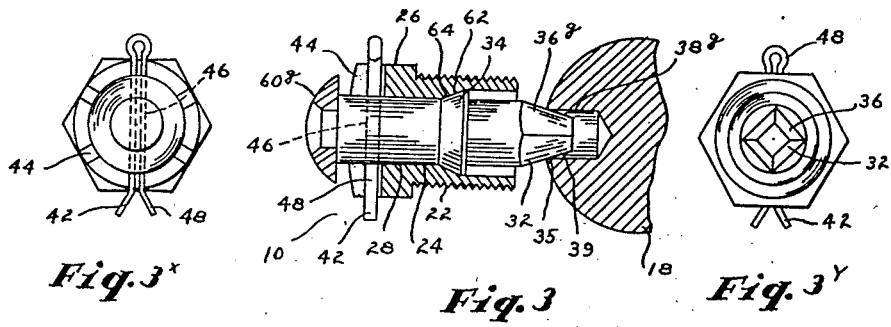

2,355,901

UNITED STATES PATENT OFFICE 2,355,901

BACKLASH RESISTING LOCKING SETSCREW

Herbert G. Beede, deceased, late of Pawtucket, R. I., by Robert Jenks Beede, executor, Seekonk, Mass., assignor to Pantex Pressing Machine, Inc., Central Falls, R. I., a corporation of Delaware Original application December 6, 1940, Serial No. 368,884. Divided and this application July 9, 1943, Serial No. 494,052

4 Claims. (Cl. 151—32)

This is a division of the application of Herbert G. Beede, No. 368,884, filed December 6, 1940.

This invention of Herbert G. Beede, deceased, relates to improvements in back lash resisting locking set screws particularly of the general type of locking set screw described in his copending application No. 368,414 for Locking set screw, filed December 4, 1940, and illustrating additional embodiments of the novel features claimed therein. The present application is specifically directed to supplemental features including features tending to prevent backlash which may be employed in such a locking set screw, particularly one having a wedge point to engage with a complemental deformation or cavity in the movable member.

An object of the present invention is to so design such a wedge point locking set screw that the parts thereof may be relatively adjusted to reduce play in the locking action of the set screw on the retaining and movable members.

Further features of this invention relate to various modifications of the structural features of the improved set screw shown in this and said parent application No. 368,414 to eliminate play or backlash.

These and such other objects of this invention as may hereinafter appear will be best understood from a description of the accompanying drawing which illustrates various embodiments thereof.

In the drawing,

Fig. 1 is a sectional view of a first modification of a locking set screw showing the retaining or first member in section, the bolt member of the set screw in axial section and the stem member and locking means in elevation.

Fig. 1$^x$ is a plan view of the first modification of locking set screw.

Fig. 1$^y$ is a reverse plan view of the first modification of locking set screw.

Fig. 2 is a sectional view similar to Fig. 1 of a second modification of the invention with the retaining member omitted having a different modification of means adapted to wedgedly engage a preformed deformation in the movable member, showing the bolt portion of the set screw in axial section and the stem member and locking means in elevation and illustrating the improved type of play prevention means of Fig. 1, and another type of locking and jacking means.

Fig. 2$^x$ is a plan view of the modification of locking set screw shown in Fig. 2.

Fig. 2$^y$ is a reverse plan view of the modification of locking set screw shown in Fig. 2.

Fig. 3 is a sectional view similar to Fig. 1 of a third modification of the invention with the bore of the bolt member only extending part of the distance downwards from the upper end thereof and defining the recess circular in cross-section at a spaced distance from the lower end of the bolt member instead of at the lower end as shown in Figs. 1 and 2 and with the cooperating conical surface of the stem member similarly raised from the lower end of the stem member, showing the bolt member of the set screw in axial section and the stem member and locking means in elevation, said set screw being similar in other respects to the set screw shown in Fig. 1.

Fig. 3$^x$ is a plan view of the third modification of locking set screw.

Fig. 3$^y$ is a reverse plan view of the third modification shown in Fig. 3.

In the drawing, wherein like characters of reference generally indicate like parts throughout, 10 generally indicates a locking set screw similar to those shown in said applications.

While his improved type of set screw 10 may be employed for locking any type of a relatively movable second member 18 in adjusted position relative to a retaining or first member 16, he has illustrated it in the drawing as employed to lock a movable shaft or second member 18 in a bore 14 in a housing or first member 16, the set screw having a threaded shank 22 being inserted within a threaded set screw hole 12 in said housing or first member 16. In all embodiments of the invention shown, the shank 22 comprises the usual bolt member 22 of a set screw and is provided with a hollow preferably smooth circular axial bore 28 and with a standard type of turning head 26 or other suitable turning means. The inner locking stem member 24 extends through said hollow bolt shank member bore 28 and has an end portion 32 with an upper portion 34 of greater area than said bolt member bore 28 below said bore to positively limit the axial outward movement of said stem member 24 relative to said bolt member 22, and with means 36 on the lower end thereof for non-rotatably engaging said movable member 18 in said retaining member recess 14 to restrain relative movement between said relatively movable second and retaining first members. He also employs means 42 for locking said bolt member 22 to said inner stem member 24 with said means 36 on the end portion 32 of said stem member thereof non-rotatably engaging said second movable member 18 in the desired adjusted manner.

Any suitable means 36 on the lower end of said end portion 34 for non-rotatably engaging said movable second member to restrain relative movement between said movable second and retaining first members may be employed, and he has shown in the drawing two types of such means, although the features of the present invention may be employed with any of the three species described in said other application, namely, (1) means on said end portion to positively mate with preformed means on said movable member, as in the modification shown in Figs. 1, 2 and 3; and (2) a pointed projection on said end portion adapted to positively bite into said movable second member to form its complementally shaped interlocking portion thereon while being inserted. This feature (2) is also partially shown in the modifications shown in Figs. 1, 2 and 3, wherein the projection is of a different shape from its cooperating cavity to deform its complementally shaped interlocking portion thereon while being inserted to also provide a wedging locking action in the modifiications shown in Figs. 1, 2 and 3.

In the modification of his invention shown in Fig. 1 he has provided the portion 36$^g$ shown therein as of truncated pyramidal shape to fit into a cylindrical radial hole 38$^g$ in said shaft, the edges 39 of said pyramid biting into the edge of the side wall of said cylinder to wedgedly engage said point 36$^g$ in the cooperating recesses 35 formed in said edge. In the modification of the invention shown in Fig. 2, the portion 36$^h$ shown therein comprises a frustro conical lower end 36$^h$ adapted to contact the edge of the side wall of a cylindrical radial hole 38$^h$ in said shaft 18 to positively prevent relative movement between said movable member 18 and retaining member 16.

In the modification of the invention shown in Fig. 3 he has shown a pyramidal point 36$^g$ similar to that shown in Fig. 1 adapted to fit into a cylindrical radial hole 38$^g$ in the shaft.

Any suitable type of means 42 for locking the rotatable bolt member 22 to said stem member 24 with the engaging means 36 non-rotatably engaging said movable second member in the desired adjusted manner may be employed. In the modifications shown in Figs. 1 and 3, he has illustrated the preferred type of locking means consisting of a plurality of diametric slits 44 in the upper surface of the turning head 26 of the bolt member 22 and he preferably provides a diametric hole 46 adjacent the outer end of the stem member. After the shaped engaging means 36 of the end portion 32 of the stem member has engaged the shaft 18, a cotter pin 48 may be inserted through the most adjacent diametric slit 44 in the turning head 26 and the diametric hole 46 in said stem member for this purpose aligned therewith. For the purpose of relatively turning the stem member 24 to said bolt member 22, the outer end of the stem member may be provided with suitable means for turning it, such as the diametric slot 50, shown in Fig. 2, to receive the end of a screw driver therein. If desired, however, a separate external head of any standard type known in the art may be employed. In place of the preferred type of locking means 42, any suitable type of locking means may be employed, such as the lock washer 42$^h$ of standard construction shown in Fig. 2, which may be inserted axially between the head 26 of the bolt member 22 and the jack nut 60$^f$ shown therein, although a lock washer 42$^h$ may be employed between other portions of said bolt and stem members.

A method of eliminating play between the set screw and the movable member may be provided in the structure of the set screw itself. For this purpose the bore 28 of the outer hollow bolt member 22 is provided with a conical portion 62, inwardly tapered, preferably near the lower end thereof as shown in Figs. 1 and 2, or centrally of the bolt member as shown in Fig. 3 and the upper portion 34 of said portion 32 of greater area than said bolt member bore 28 may be provided with a complementally shaped upper surface 64 to wedgedly engage the surface 62 of said bore 28 to prevent play. It is obvious that with this construction the cooperating tapered surfaces 62 and 64 will engage against each other to prevent play between the bolt member 22 and the stem member 24, thereby preventing play between such members. In the embodiment shown in Fig. 3, however, the bore 28 terminates at a substantial distance above the lower end of the bolt member and defines the enlarged tapered recess 62 circular in cross section in said hollow bolt. In this embodiment the cooperating conical surface 64 of the stem member is correspondingly raised from the lower end of the bolt member to engage with said recess 62 to prevent play. If, however, the wedge points 36$^g$ and 36$^h$ be also employed to positively engage a shaped cavity, whether preformed or formed by the insertion of the stem member 24, play will also be substantially eliminated between said stem member 24 and movable member 18. It is apparent, therefore, that if both types of means to prevent play, namely (1) between the bolt member and the stem member and (2) between the point of the stem member and the movable member be employed, play and backlash will be substantially eliminated, as in the modifications shown in Figs. 1–3.

To employ the set screw, it is merely necessary to screw the set screw 10 within the hole 12 until the engaging means 36 thereof firmly abuts the desired portion of the movable member 18 no matter what the cooperating shapes of said engaging means 36 and movable member may be. If desired, as shown in Fig. 2, a slot 50 may be provided in the outer end of the stem member to rotate the stem member 24 within the hollow bolt 22. To prepare for locking, if necessary, the head 26 may be further turned until a selected channel 44 in said turning head 26 is brought into alignment with the diametric hole 46 on the stem. To lock, the locking pin 48 may then, in the modification shown in Figs. 1 and 3, be inserted through said aligned channel 44 and diametric hole 46 to permanently lock the set screw in the desired adjusted position with the engaging means thereof engaging said movable member in the desired adjusted manner. The modification of the invention shown in Fig. 2 may be locked on suitable turning movement of the jack nut 60$^f$, the lock washer 42$^h$ becoming automatically locked as the jack nut is turned relative to said turning head 26. It is apparent that turning the turning head automatically brings the conical surfaces 62 and 64 into intimate contact throughout the periphery thereof to prevent backlash substantially at the moment that the engaging means 36 engages the movable member 18, the friction between these two surfaces, however, being increased if an extra turning movement is given for the purpose of aligning or locking the locking means.

To remove the set screw, in the modifications shown in Figs. 1 and 3, it is merely necessary to release the locking means by withdrawing the pin 48 and unscrewing the turning head 26 which will abut the enlarged jacking head 60g of the stem member which will function to pull the pointed end 36g of the stem member out of engagement with its cooperating cavity 38g in the movable member 18. In the modification of the invention shown in Fig. 2, the jack nut 60f may be inserted on said threaded end 65 of the stem member merely for the purpose of removing the set screw by providing means for positively pulling the set screw point 36 out of engagement with its cooperating cavity 38 on the shaft 18. For this purpose the jack nut 60f is only screwed on said threaded end until it is adjacent to but not touching the upper surface of the turning head 26 so that it will not function as a lock nut therefor. The same wrench may be employed to turn the turning head 26 and also turn the jack nut 60f to partially simultaneously unscrew the set screw and provide jacking means to positively pull the pointed end 36 of the stem member out of engagement with its cooperating cavity 38 in the shaft member 18 on a later tightening of the jack nut 60f in the manner hitherto described, the cooperating threads 65 on the outer periphery of the stem member 24 and the threads on the inner periphery of the jack nut 60f cooperating as inclined planes to effect this pulling movement. If the jack nut 60f be also employed as a portion of the locking means, as shown in Fig. 2, it is obvious that it will have to be initially unscrewed on said threads 65 to be moved out of contact with the lock washer 42h to release said locking means prior to the actuation of said lock nut 60f by a suitable wrench or other means, said lock nut 60f then functioning as a jack nut to positively pull the pointed end 36 of the stem member out of engagement with its cooperating cavity 38 in the movable member in similar manner as in the other modifications. It is also obvious that the jack nut 60f will function in the manner explained to release the backlash preventing means, comprising the contacting conical surfaces 62 and 64 of the modifications shown in Figs. 1, 2 and 3, as the jack functions to release the pointed end 36 from its cooperating cavity 38.

It is apparent, therefore, that he has provided certain novel modifications employing the general principles of the set screw shown in his companion application heretofore referred to, particularly adapted to positively engage the movable member with a wedging action and to provide means to prevent play and backlash between the parts thereof and the movable member and that he has also provided, preferably in association therewith, a suitable means effective on withdrawal of said set screw to positively pull said movable or pointed engaging means 36 away from engagement with said movable member and at the same time release said play preventing means with the advantages described above.

It is understood that his invention is not limited to the specific modifications shown or described and that various deviations may be made therefrom without departing from the spirit and scope of the appended claims.

What he claims is:

1. A set screw for insertion within a threaded set screw hole in a first member extending to a second member movable relative to said first member, comprising a threaded bolt member having a smooth circular bore with a conical surface defining an enlarged recess circular in cross-section and turning means, a smooth stem member extending through said bore and having a portion of greater area than said bore having a cooperating conical surface engageable with said recess to prevent play and having means on the lower end thereof for non-rotatable engagement with said second member and means for locking said bolt member to said stem member against relative rotative movement, said stem member having means associated with the upper end thereof of greater area than the bore of the bolt member to release said cooperating engaging surfaces on unscrewing of said bolt member.

2. A set screw for insertion within a threaded set screw hole in a first member extending to a second member movable relative to said first member, comprising a threaded bolt member having a smooth circular bore with a conical surface defining an enlarged recess circular in cross-section and turning means, a smooth stem member extending through said bore and having a portion of greater area than said bore having a cooperating conical surface engageable with said recess to prevent play and having a projecting portion at the lower end thereof to fit into a cavity in said second member with a wedging action and means for locking said bolt member to said stem member against relative rotative movement, said stem number member having means associated with the upper end thereof of greater area than the bore of the bolt member to release said cooperating engaging surfaces on unscrewing of said bolt member.

3. A set screw for insertion within a threaded set screw hole in a first member extending to a second member movable relative to said first member, comprising a threaded bolt member having a smooth circular bore with a conical surface defining an enlarged recess circular in cross-section at the lower end thereof and turning means, a smooth stem member extending through said bore and having a portion of greater area than said bore beyond the threaded end of said bolt member, said end portion having its largest effective diameter less than the continuous effective diameter of the set screw hole so that it may be freely rotated therein and having a cooperating conical surface engageable with said recess to prevent play and having means on the lower end thereof for non-rotatable engagement with said second member and means for locking said bolt member to said stem member against relative rotative movement, said stem number member having means associated with the upper end thereof of greater area than the bore of the bolt member to release said cooperating engaging surfaces on unscrewing of said bolt member.

4. A set screw for insertion within a threaded set screw hole in a first member extending to a second member movable relative to said first member, comprising a threaded bolt member having a smooth circular bore with a conical surface defining an enlarged recess circular in cross-section at the lower end thereof and turning means, a smooth stem member extending through said bore and having a portion of greater area than said bore beyond the threaded end of said bolt member, said end portion having its largest effective diameter less than the continuous effective diameter of the set screw hole so that it may be freely rotated therein and having a cooperating conical surface engageable with said recess to prevent play and having a projecting portion at the lower end thereof to fit into a cavity in said second member with a wedging action and means for locking said bolt member to said stem member against relative rotative movement, said stem member having means associated with the upper end thereof of greater area than the bore of the bolt member to release said cooperating engaging surfaces on unscrewing of said bolt member.

ROBERT JENKS BEEDE,
Executor of the Estate of Herbert G. Beede, Deceased.